United States Patent [19]

Calvin et al.

[11] Patent Number: 5,123,447
[45] Date of Patent: Jun. 23, 1992

[54] QUICK DISCONNECT COUPLING

[76] Inventors: John H. Calvin, 251 Toro Canyon Rd., Carpenteria, Calif. 93013; Jose M. Alandy, 2091 San Onofre Dr., Camarillo, Calif. 93010; Jack Y. Wakasa, 4025 Michael Ave., Los Angeles, Calif. 90066

[21] Appl. No.: 667,654

[22] Filed: Mar. 11, 1991

[51] Int. Cl.$^5$ .............................................. F16L 37/28
[52] U.S. Cl. ...................... 137/614.03; 137/614.05; 285/313; 285/316; 285/900
[58] Field of Search ................ 137/614.03, 614.04, 137/614.05, 614.06; 285/313, 316, 900; 251/149.6, 281, 282

[56] References Cited

U.S. PATENT DOCUMENTS

| | | | |
|---|---|---|---|
| 2,837,352 | 6/1958 | Wurzburger | 137/614.03 |
| 3,039,794 | 6/1962 | DeCenzo | 137/614.03 |
| 3,224,728 | 12/1965 | Buseth et al. | 137/614.03 |
| 4,007,909 | 2/1977 | Buseth et al. | 285/316 |
| 4,596,272 | 6/1986 | Medvick et al. | 137/614.03 |
| 4,982,761 | 1/1991 | Krezko et al. | 285/316 |

*Primary Examiner*—A. Michael Chambers

[57] ABSTRACT

A quick disconnect coupling for connecting together two conduits in a high pressure fluid-carrying system. The coupling includes a female part (coupler) and a male part (nipple) each provided with a flow through channel, and each provided with a cut-off valve. The nipple is designed to be inserted into the flow-through channel of the coupler to cause the two parts automatically to be firmly latched together and to be sealed to one another during a pre-mating condition, without opening cut-off valves in the nipple and coupler. This initial pre-mating action isolates any fluid contained in the two parts of the coupling from the environment. Then, an axial force applied to the outer housing of the coupler causes both the nipple and coupler valves to open to establish fluid flow through the coupling. Pressure balancing features are incorporated into the valves to permit the use of significantly lower axial force to open valves as compared with the force required to open the valves of the prior art couplings of the same general type.

8 Claims, 2 Drawing Sheets

QUICK DISCONNECT COUPLING

BACKGROUND OF THE INVENTION

The present invention relates to a quick disconnect coupling device consisting of two detachable parts, and which is particularly designed for coupling and de-coupling two conduits in a high pressure fluid line without the need initially to depressurize the conduits.

Such couplings are generally known to the art, and is usual in such devices, that one or both of the detachable parts be equipped with a spring-loaded valve. The valve is automatically closed when the two parts of the coupling are detached from one another, and the valve is automatically when the two parts are connected together. Such valves are essential in order that the coupling may achieve its quick-disconnect feature permitting the two conduits to be connected and disconnected without first depressurizing the line.

When the two detachable parts of the coupling are to be connected to one another under conditions in which at least one of the conduits carries high pressure fluid, the operation is often difficult with the prior art coupling, because it is often necessary for substantial axial force to be exerted to open the internal valves when the two parts of the coupling are mated together. Also, during the mating operation of the prior art quick disconnect couplings, there is often a possibility for the internal valve prematurely to open slightly causing leakage, such leakage can often create hazardous conditions.

It is accordingly, an objective of the present invention to provide an improved quick-disconnect coupling for loaded cut-off valves in its mating parts, the coupling of the invention being constructed so that the parts may be connected to one another or detached from one another without any danger of fluid leakage and with a minimum of axial force.

Another objective of the invention is to provide such an improved quick-disconnect coupling which is constructed to proof against any inadvertent decoupling of the two detachable posts.

SUMMARY OF THE INVENTION

The present invention is concerned with a quick-disconnect coupling for connecting together two conduits in a high pressure fluid carrying system. The coupling includes two detachable parts, namely a female coupler and a male nipple, each part being provided with a flow-through channel, and each part including a spring-loaded cut-off valve. The coupling of the invention is constructed so that when the nipple is initially inserted into the flow-through channel of the coupler, the nip and coupler are automatically firmly latched together and sealed to one another without opening the cut-off valves in the nipple and coupler. This initial mating action isolates the fluid contained in the two parts of the coupling from the environment Then, when an axial force is applied to the outer housing of coupler, the two parts are caused to move together to their final position causing the spring-loaded valves in both the nipple and coupler to open and establish fluid flow through the coupling. Pressure balancing features are incorporated into the valves in the nipple to coupler to permit the use of significantly lower axial force to open the valves as compared with the force required in the prior art couplings.

DETAILED DESCRIPTION OF THE ILLUSTRATED EMBODIMENT

Figure 1:
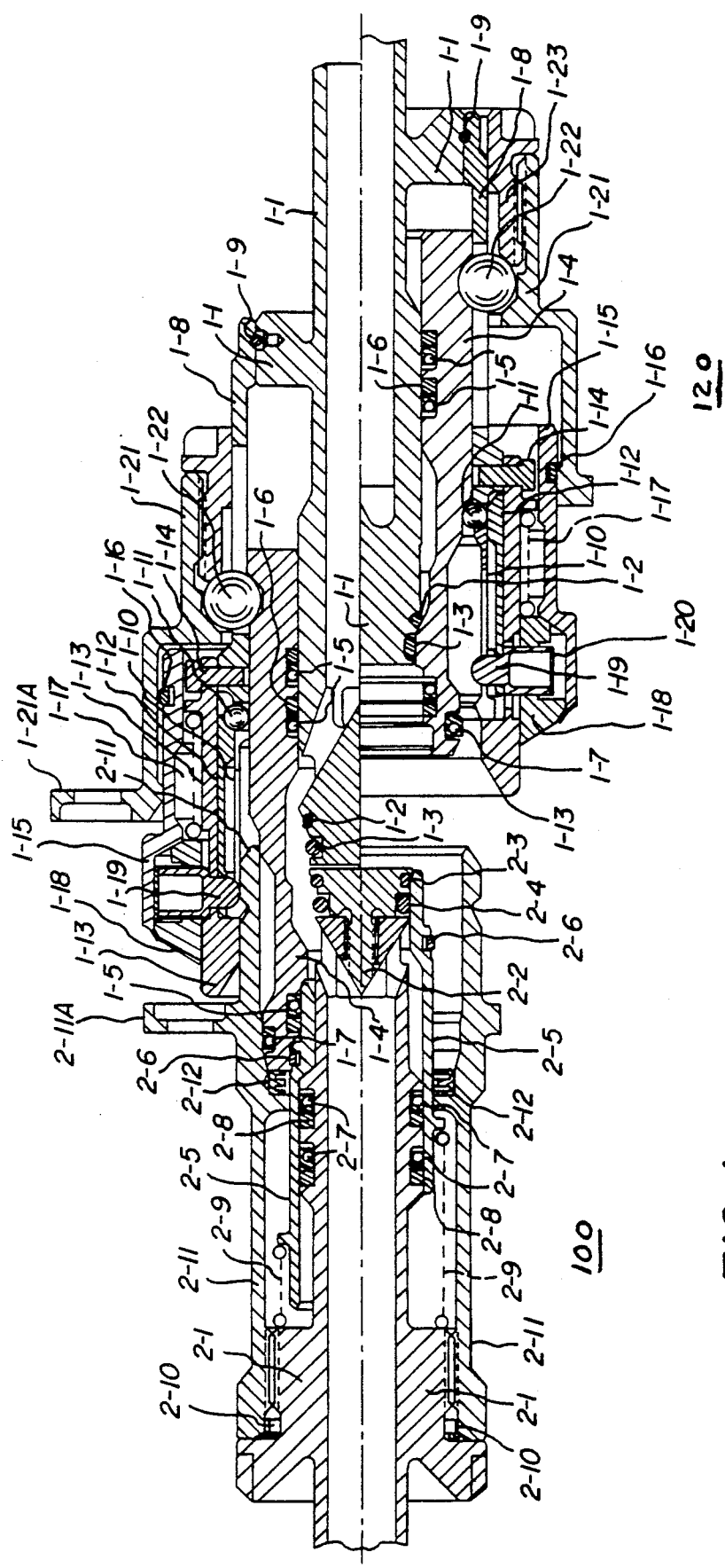
FIG. 1 is a side section of one embodiment of the coupling of the invention with the upper half of FIG. 1 showing the two parts of the coupling in a coupled condition and with the lower half showing the two parts in a de-coupled condition.

The embodiment of the invention shown in FIG. 1 includes a male nipple 100 shown on the left hand side of the drawing, and a female coupler 120 shown on the right side of the drawing. The nipple 100 includes an outer housing 2-11 which h an integral annular flange 2-11A circumscribing its forward end. an annular flange 1-21A at its forward end.

The nipple and coupler may be latched together by applying opposing pushing linear forces to flanges 2-11A and 1-21A; and they may be detached by applying opposing pulling linear forces to the two flanges. One or both flanges may be motor driven, for example, to create the pushing and pulling linear forces. When the nipple and coupler are initially pushed together, the two parts first automatically latch in a coupled relationship. This initial mating action isolates the fluid contained in the two parts from the environment. Further pushing linear movement of the two parts opens spring-loaded valves therein to permit fluid flow through the coupling. The detaching operation of the two parts is exactly the reverse of the attaching operation described above.

The nipple 100 also includes an inner housing 2-1 which is coaxial with the outer housing 2-11. A coaxial sleeve 2-2 is mounted between the outer housing 2-Il and the inner housing 2-1. A stop 2-2 is mounted on the inner housing 2-1 at one end of sleeve 2-5, and in axial alignment with the inner housing 2-1, spring 2-9 biases sleeve 2-5 to the right in with respect to inner housing 2-1. 1

A seal 2-10 is interposed between the inner housing 2-1 and the outer housing 2-11 at the left hand end of nipple 100. Two annular seals 2-7 and two backup rings 2-8 are interposed between the inner housing 2-1 and sleeve 2-5. A detent ring 2-6 is mounted on the right hand of sleeve 2-5. An 0-ring 2-4 is mounted on stop 2-2 to seal the stop to sleeve 2-5. A stop 2-3 is also mounted on stop 2-2.

The sleeve 2-5 and spring 2-9 form a spring loaded valve in nipple 100 which is closed when the nipple is detached from coupler 120, as shown in the lower half of FIG. 1. This valve is opened when the nipple is attached to the coupler, as shown in the upper half of FIG. 1.

Coupler 120 includes an inner housing 1-1 coaxial with the outer housing I-21 and a coaxial sliding housing 1-4 is interposed between the outer and inner housings. Coupler 120 also includes a tubular forward support 1-13 and tubular aft support 1-8. The forward support is attached to the aft support by pins 1-14. An actuating sleeve 1-15 is mounted coaxially between the forward support 1-13 and the outer housing 1-21. A release ring 1-18 is interposed between the forward support 1-13 and the actuating sleeve 1-15.

Three detent pins 1-19 extend through release ring 1-18 and through slide 1-12 which engage balls 1-11. A lock 1-10 holds the balls 1-11 against the edge of an opening in the forward support 1-13. A spring 1-17 biases the actuating sleeve 1-15 to the left with respect to the forward support 1-13. A detent ring 1-16 is mounted coaxially on actuating sleeve 1-15 and engages the outer housing 1-21. Outer housing 1-21 moves along with four balls 1-22. A tubular plug 1-23 is interposed between the outer housing 1-21 and the aft support 1-8. Plug 1-23 retains balls 1-22. A retainer wire 1-9 is interposed between the inner housing 1-1 and the aft support 1-8.

A seal 1-5 and a backup ring 1-6 are interposed bet the sliding housing 1-4 and the inner housing 1-1. An O-ring 1-2 3 and an annular seal 1-2 are interposed between inner housing 1-1 and sliding housing 1-4. An annular seal 1-7 is mounted on the left hand of sliding housing 1-4 to seal the sliding housing to the outer housing 2-11 of the nipple, when the nipple and coupler are engaged, as shown by the top half of FIG. 1.

As illustrated in the bottom half of FIG. 1, the spring loaded valve in coupler 120 is closed when the coupler is detached from nipple 100, and the valve is sealed by seals 1-3, 1-2. However, when the nipple and coupler are fully engaged, valve is opened, together with the valve in the nipple, to provide a flow through path for pressurized fluid through the coupling.

When the coupler 120 is first brought into mating relationship with nipple 102, the coupler is moved over the nipple until the collet fingers of lock 1-10 latch into a in the outer housing 2-11 of the nipple. This latching action pushes up and releases the detent pins 1-19 from captive slots in the forward support 1-13 of the coupler. The force exerted by the coupler spring 1-17 now automatically pushes the coupler release ring 1-18, the actuating sleeve 1-15 and slide 1-12 in the forward direction. The coupler slide 1-12 is now held firmly in place over the fingers of lock 1-10, and the nipple 100 and coupler 120 are now firmly latched together. Only an external pulling force against the coupler release ring 1-18, or actuating sleeve 1-15, will disengage the coupler from the nipple.

The action described above constitutes an initial coupling feature of the invention which causes the forward seal 1-5 of the coupler sliding housing 1-4 to seal over the nipple sleeve 2-5 without opening the valves. The coupler sliding housing 1-4 now also engages the nipple detent ring 2-6 during this initial coupling action. The initial coupling action serves to isolate the fluid contained in the nipple and coupler from the environment.

Now, when a forward axial force is applied to flange 1-21a of the coupler outer housing 1-21, the internal valving is caused to open. Such axial force pushes the coupler balls 1-22 against the coupler sliding housing 1-4 which causes the sliding housing 1-4 to move forward. This action simultaneously opens the coupler and nipple valves to establish fluid flow through coupling.

During the initial forward movement of the sliding housing 1-4, the coupler detent balls 1-11 are rammed up through holes in the coupler lock 1-10, and the balls are now positioned behind the coupler slide 1-12. This action inhibits the movement of the slide and prevents release (accidental or otherwise) of the nipple and coupler while the valves are open, or are in the process of being opened. The forward movement of the sliding housing 1-4 ends when it engages the metal seal 2-12 of the nipple. At this point, full fluid flow through the coupling is established.

Pressure balancing features are designed into the valves of the quick-disconnect coupling of the invention as will be described. These pressure balancing features permit the use of a significantly lower axial force to open the valves in nipple 100 and coupler 120 when these parts are brought together, as compared with the axial force required in the prior art couplings of the same general type.

During the initial coupling action, the sealing diameter of the forward and aft seals 1-5 of the coupling sliding housing 1-4 are the same as the sealing diameter of the seals of the nipple inner housing 2-1 and nipple sleeve 2-5. Since sealing diameters of these seals are equal on either side of the valves, the forces induced by fluid pressure are balanced out. Therefore, the valve opening force to be overcome results only from seal friction and the force of the spring 2-9 of the nipple.

The procedure for decoupling the nipple 100 from the coupler 120 is the exact reverse of the coupling procedure described above. The first step in the decoupling process is to apply an axial force to the outer housing 1-21 of the coupler which is directed away from the nipple. This force pulls the coupler balls 1-22 against the coupler sliding housing 1-4 to move the sliding housing to the right in FIG. 1. This movement of the sliding housing simultaneously closes the coupler and nipple valves to stop the pressurized fluid flow through the coupling. Specifically, at the end of the travel of the outer housing 1-21 of the coupler, a shoulder on the outer housing engages detent ring 1-16. This action pulls the actuating sleeve 1-15, as well as, the release ring 1-18, detent pins 1-19 and slide 1-12 to the right in FIG. 1 As slide 1-12 is so it pushes detent balls 1-11 down through the holes in lock 1-10 and down the ramp on the sliding housing 1-4. The inner diameter of slide 1-12 holds the detent balls 1-11 against the ramp of sliding housing 1-4 to prevent forward motion of the sliding housing 1-4, inadvertent or otherwise, which would result in subsequent valve opening.

Pulling the slide 1-12 in the manner described above allows the collet fingers of lock 1-10 to move radially away from the groove in the outer housing 2-11 of the nipple to cause the coupler 120 to be decoupled from nipple 100. As the coupler 120 is pulled away, the detent pins 1-19 drop through captive slots in the forward support 1-13 to hold the release mechanism in a locked and detented position ready for recoupling with the nipple.

Figure 2:
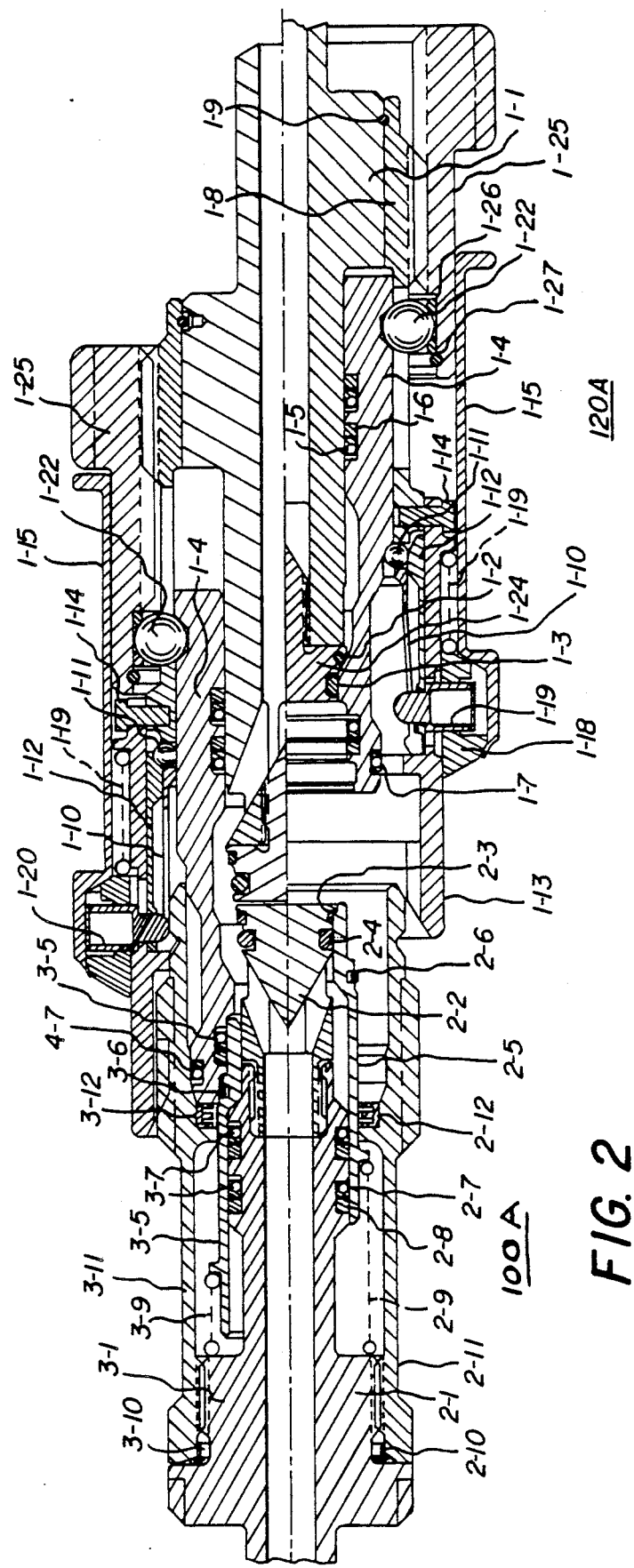
FIG. 2 is side section of a second embodiment of the coupling of the invention and constitutes a similar representation to that of FIG. 1.

The embodiment of FIG. 2, is generally similar to embodiment of FIG. 1, except that the nipple 100A and coupler 120A are coupled and decoupled by a torque applied to a sleeve 1-25 (FIG. 2). This sleeve replaces the outer housing 1-21 of the coupler 120 of the previous embodiment. Instead of axial forces being applied to flanges 2-11A and 1-21A in the embodiment of FIG. 1, rotation of sleeve 1-25 of coupler 120A produces the same axial movements of the components of the coupling of FIG. 2 as were produced by pulling or pushing the flanges in the embodiment of FIG. 1.

Components in the embodiment of FIG. 2 which are the same as in the embodiment of FIG. 1 has been designated by the same numbers. In the embodiment of FIG. 2, ball 1-22 is seated in bushings 1-26, and the assembly is retained by wire retainer 1-27. Also the innerhousing 1-1 the embodiment of FIG. 2 has a stop 1-24 at its forward end which engages stop 2-2 of the nipple 100A when the coupler 120A and nipple 100A are coupled together. In other respects, the embodiment of FIG. 2 is structurally the same as the embodiment of FIG. 1, and operates in the same manner.

The invention provides, therefore, an improved quick-disconnect coupling consisting two detachable parts, and which is particularly designed for coupling the two conduits together in a high pressure fluid carrying system, without the need initially to depressurize the conduits.

As described, in the improved coupling of the invention, the nipple and coupler may be pre-mated in an initial coupling relationship in which the internal valves of the coupling are still closed to minimize the possibility of fluid leakage. This pre-mating condition occurs when the coupler and nipple are first brought into contact with one another, at which time the spring loaded slide member is released over the collet fingers of the locking member of the coupler in a locking condition. This serves to avoid any inadvertent separation of the coupler from the nipple during the premating condition. As described above, the slide member is released automatically and spring biased into its retaining position over the locking fingers when the nipple and coupler are first brought into the pre-mating position.

The coupling is also constructed so that subsequent movement of the sliding housing member of the coupler causes the valves in the nipple and in the coupler to open. This is achieved with minimal force being required due to the fact that the sealing surfaces of various seals in the coupling are aligned with one another to balance out the forces due to the fluid pressure within the coupling.

It will be appreciated that while particular embodiments of the invention have been shown and described, modifications may be made. It is intended in the claims to cover all modifications which come within the true spirit and scope of the invention.

I claim:

1. A coupling formed of a tubular coupler, and of a tubular nipple adapted to be received in the coupler in coaxial relationship, said nipple comprising: a tubular inner housing, a coaxial tubular sleeve surrounding said inner housing and axially movable relative thereto, said inner housing having a port at the forward end thereof communicating with the interior of the inner housing, spring means biasing said sleeve toward the forward end of the nipple normally to close the port and thereby forming a valve in the nipple, and the tubular coupler comprising: an inner, tubular housing having a port at the forward end thereof, a sliding tubular housing surrounding said inner housing in coaxial relationship therewith and axially movable with respect to the inner housing from a retracted position in which it closes the port and an extended position in which the port is open, said sliding housing thereby forming a valve in said coupler, means automatically latching said coupler to said nipple in a pre-mating relationship when the nipple is inserted into the coupler, with the inner housing of the nipple and the inner housing of the coupler being axially aligned with one another and with the valves in the nipple and coupler being in a closed condition, the combination being such that axial movement of the coupler after the initial pre-mating relationship causes the sliding housing of the coupler to surround the sleeve of the nipple in coaxial relationship and to move the sleeve of the nipple against the pressure of the spring means in the nipple to open the port in the inner housing of the nipple, and in which the sliding housing of the coupler thereby opens the valve in the coupler and establishes a conduit from the port of the inner housing of the nipple to the port of the inner housing of the coupler for the for the flow of fluid through the coupling.

2. A coupling formed of a tubular coupler, and of a tubular nipple adapted to be received in the coupler in coaxial relationship, said nipple comprising: a tubular outer housing having an annular groove at the forward end thereof, a tubular inner housing coaxial with the outer housing, a coaxial tubular sleeve interposed between the outer and inner housings and axially moveable relative thereto, said inner housing having a port at the forward end thereof communicating with the interior of the inner housing, and spring means biasing said sleeve toward the forward end of said nipple normally to close said port and thereby forming a valve in the nipple, and said tubular coupler comprising: an inner tubular housing having a port at the f end thereof, an outer tubular housing coaxial with said inner housing, a sliding tubular housing interposed between the outer and inner housings and axially moveable with respect to the inner housing from a retracted position in which it closes the port and an extended position in which the port is open, said sliding housing thereby forming a valve in said coupler, a tubular support member interposed between said outer housing and said inner housing, an annular lock member interposed between said tubular support member and said sliding housing in coaxial relationship therewith and having at least one axially extending locking finger to be received in the groove in the outer of the nipple when the coupler is brought into an initial pre-mating relationship with the nipple, in which the tubular support member surrounds the outer housing of the nipple in coaxial relationship and with the inner housing of the nipple and the inner housing of the coupler being axially aligned with one another, and with the valves in the nipple and coupler being in a closed condition, means coupling the outer housing of the to the sliding housing so that axial movement of said outer housing toward said nipple after said initial pre-mating relationship causes said sliding housing to be interposed between said outer housing and the sleeve of the nipple and to move the sleeve of the nipple against the pressure of the spring means in the nipple to open the port in the inner housing of the nipple, and said sliding housing thereby opening the valve in the coupler and establishing a conduits from the port of the inner housing of the nipple to the port of the inner housing of the coupler for the flow of fluid through the coupling.

3. The coupling defined in claim 2, and which includes first means in said nipple including at least one annular seal interposed between said sleeve and the inner housing of the nipple on one side of the port in said inner housing, second means including at least one annular seal interposed between said sleeve and said inner housing on the other side of said port when the port is closed by said sleeve, and which includes third means in said coupler including at least one annular seal interposed between the sliding housing and the inner housing of the coupler on one side of the port in said inner housing, and fourth means including at least one annular seal interposed between the sliding housing and the inner housing on the other side of said port.

4. The coupler defined in claim 3, and which includes fifth means including at least one annular seal interposed between the forward end of aid sleeve of said nipple and said inner housing of said coupler when the ports in the inner housings of the nipple and coupler are opened.

5. The coupler defined in claim 4, in which the sealing diameters of the annular seals included in said third and fifth means are the same as the sealing diameter of the annular sleeve included in said first means to balance out the forces induced by fluid pressure in the nipple and coupler.

6. The coupling defined in claim 2, and which includes an annular coaxial slide member interposed between said locking fingers and said support member and axially moveable from a retracted position to a released position, said slide member extending over the locking fingers of said lock member to hold the locking fingers firmly in place in said groove, spring means biasing said slide member to its released position, and at least one spring loaded detent member mounted on said support member and extending through said slide member for holding said slide member in its retracted position, said detent member releasing said slide member when the support member extends over the forward end of the outer housing of the nipple to hold said locking fingers firmly in said annular groove, thereby latching said nipple to said coupler in an initial mating condition in which the valves in the nipple and coupler remain closed.

7. The coupling defined in claim 6, in which includes a coaxial actuating sleeve interposed between the outer housing of the coupler and said support member, and a release ring coaxially interposed between the forward end of said actuating sleeve and said support member with said detent extending radially through an aperture in said release ring and through an opening in said support member and means responding to movement of said release ring away from the nipple to return the detent to a position in which it holds the slide member intents retracted position after the slide member has been returned to its retracted position.

8. A coupling formed of a tubular coupler and of a tubular nipple adapted to be received in the coupler in coaxial relationship therewith, said nipple comprising: a tubular inner housing, a coaxial tubular sleeve surrounding said inner housing and axially movable relative thereto, said inner housing having a port at the forward end thereof communicating with the interior of the inner housing, spring means biasing said tubular sleeve toward the forward end of said nipple normally to close said port and thereby forming a valve in a nipple, and said tubular coupler comprising: an inner tubular housing having a port at the forward end thereof, a sliding tubular housing coaxially surrounding aid inner housing and axially movable with respect to the inner housing from a retracted position in which is closed the port and an extended position in which the port is open, said sliding housing thereby forming a valve in said coupler, first means included in said nipple having at least one annular seal interposed between said sleeve and the inner housing of the nipple and one said of the port in said inner housing, second means in said coupler including at least one annular seal interposed between the sliding housing and the inner housing of the coupler on one side of the port in said inner housing, third means including at least one annular seal interposed between the forward end of said sleeve of said nipple and said inner housing of said coupler when the nipple and coupler are in a mating position, and in which the sealing diameters of the annular seals included in said second and third means are the same as the sealing diameter annular of the annular seal included in said first means to balance out the forces induced by fluid pressure and coupler.

* * * * *